(12) United States Patent
Rana et al.

(10) Patent No.: US 8,760,281 B1
(45) Date of Patent: Jun. 24, 2014

(54) SYSTEM TRIGGERED TRAVEL ALERTS

(71) Applicant: Duetto Research, Inc., San Francisco, CA (US)

(72) Inventors: Neelav Rana, San Francisco, CA (US); Jose Benavides, San Francisco, CA (US); Marco Benvenuti, Las Vegas, NV (US); Anuj K. Jenveja, Las Vegas, NV (US); Craig Weissman, San Francisco, CA (US); Patrick Bosworth, Las Vegas, NV (US)

(73) Assignee: Duetto Research, Inc., San Francisco, CA (US)

( * ) Notice: Subject to any disclaimer, the term of this patent is extended or adjusted under 35 U.S.C. 154(b) by 0 days.

(21) Appl. No.: 13/888,623

(22) Filed: May 7, 2013

(51) Int. Cl.
    *G08B 19/00* (2006.01)
(52) U.S. Cl.
    USPC ............... 340/521; 705/5; 705/6; 705/14.27

(58) Field of Classification Search
    USPC .......................................... 340/521
    See application file for complete search history.

(56) References Cited

U.S. PATENT DOCUMENTS

2005/0030977 A1* 2/2005 Casey et al. ............... 370/485
2006/0059024 A1* 3/2006 Bailey et al. ............... 705/5

* cited by examiner

*Primary Examiner* — George Bugg
*Assistant Examiner* — Anthony D Afrifa-Kyei
(74) *Attorney, Agent, or Firm* — Lowenstein Sandler LLP

(57) ABSTRACT

A travel alert manager receives travel data from a plurality of data sources and identifies an alert data type from the travel data. The travel alert manager generates an alert for the alert data type based on a primary alert condition, the alert to provide a notification that the travel data will affect a travel property. The travel alert manager determines a priority of the alert and issues the alert if alerts matching the priority of the alert are authorized by system settings.

18 Claims, 10 Drawing Sheets

SYSTEM TRIGGERED TRAVEL ALERTS

TECHNICAL FIELD

This disclosure relates to the field of data processing, and in particular to system triggered travel alerts.

BACKGROUND OF THE INVENTION

The travel and hospitality industry in the United States and throughout the world is an ever increasing business sector. Advances in Internet and computing technology have significantly increased the opportunities to capture data from both travelers and travel properties (e.g., hotels, motels, bed and breakfasts, condominiums, houses). For example, web site based systems are used to offer the sale and rental of many travel properties and are used to make a large percentage of travel bookings. During these bookings, a significant amount of user travel data is received. The travel data may include, for example, a destination city, specific properties, dates of arrival, length of stay, room type, property amenities, price quotes, availability information, and/or other travel information. Property owners and managers are looking for chances to use this travel data to improve decisions relating to the management and sale of units in their travel properties. The mere availability of this data, however, does not by itself improve decisions that may lead to increased profits for the travel property. Conventional revenue management systems and booking engines are not equipped to make sufficient use of the newly acquired user travel data to deliver actionable insights and analysis as needed.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION OF THE PRESENT INVENTION

Figure 1:
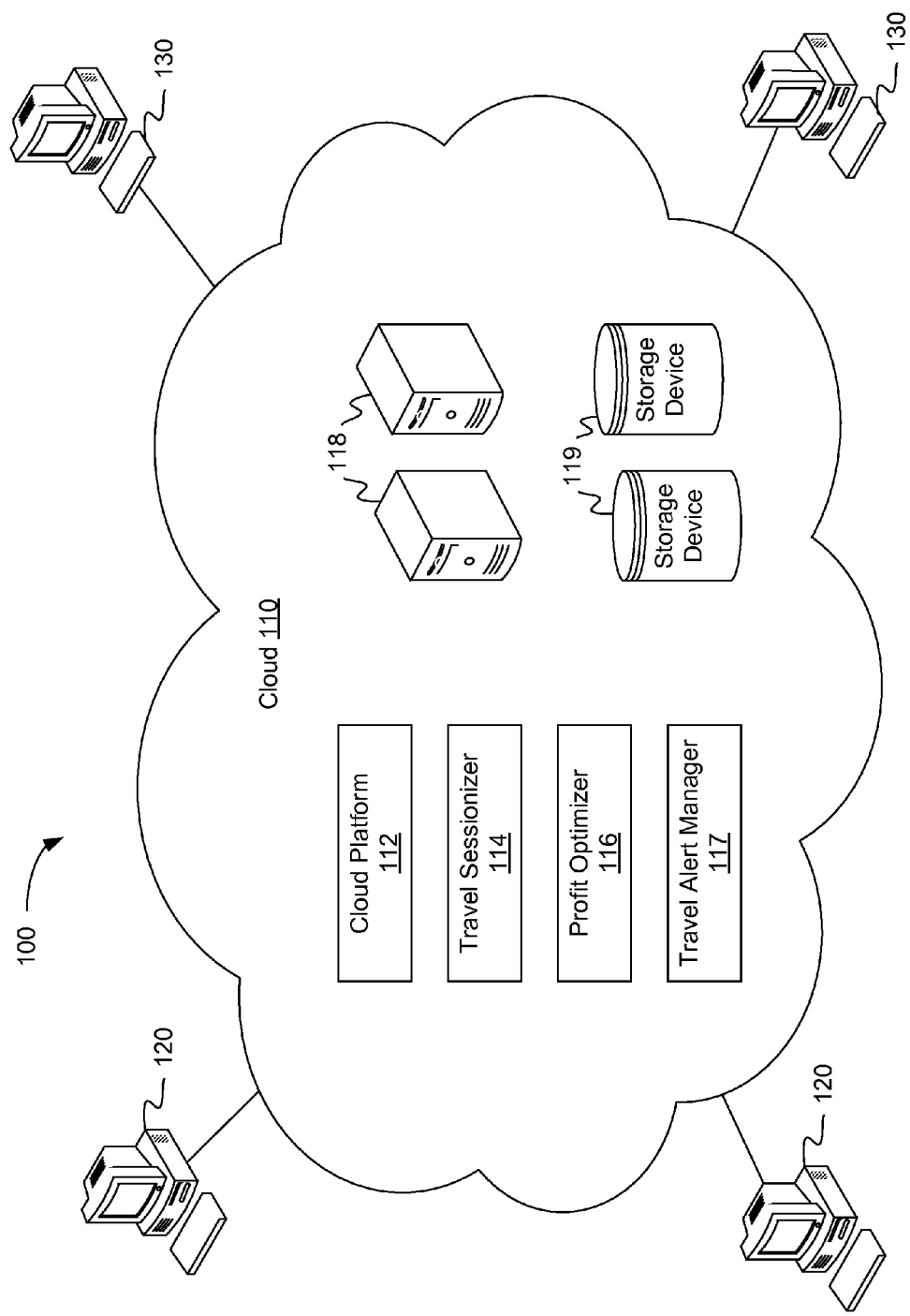
FIG. 1 is a block diagram illustrating a cloud computing environment for system triggered travel alerts, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for system triggered travel alerts. In one embodiment, a travel alert manager manages the creation and issuance of travel alerts. The travel alerts may be received by travel property owners, managers, or operators and may be used to keep those individuals informed of how certain travel data may affect their property. The system may be designed to detect anomalous behavior and issue alerts to inform the system user that there is a situation which may deviate from the normal data behavior at the travel property. For example, the travel alerts may be triggered by rate changes for the property or other competitor properties. In addition, received travel data may be analyzed to determine whether the bookings for the property are on track to meet historical norms or whether the property is reaching a maximum occupancy on a particular day. This information and other information provided in the travel alerts can help the property owner make any necessary adjustments (e.g., to the rates being changed) in order to more effectively manage the travel property.

In one embodiment, the travel alert manager determines whether to issue an alert by comparing received travel data to one or more conditions associated with various defined alerts. The conditions may be threshold values, which if met by the travel data, trigger the issuance of an alert. The travel alert manager may also consider various factors when deciding if and when to issue an alert. For example, certain alerts may be classified as in-band or out-of-band alerts. In-band alerts may be processed based on the received data and a comparison to one or more alert conditions, while out-of-band alerts may include comparison with historical data to determine whether to issue an alert. In one embodiment, in-band alerts are issued right away (e.g., at runtime), while out-of-band alerts may be held until the end of the day. In addition, the travel alert manager may determine a priority of an alert prior to sending out the alert. In one embodiment, alerts designated as high priority may always be issued, while low priority alerts may be held until a later time, or not issued at all depending on the particular configuration.

In one embodiment, the travel alert manager reduces the number of duplicate alerts by updating previously issued alerts. For example, the travel manager can monitor previously issued alerts and determine whether to update the alerts based on a secondary condition that may be different that the first or primary condition used when first issuing the alert. The secondary condition may specify a larger change in the travel data before the alert is updated. In addition, the travel alert manager may provide actionable alerts. In one embodiment travel alert manager determines if there is a corrective action associated with an alert. If there is an associated corrective action, when the alert is issued, travel alert manager may include an alert action link in the alert. The alert action link may provide a solution to correct the situation or problem that triggered the alert. Each corrective action may be specific to the associated alert. In another embodiment, the travel alert manager uses domain specific modeling ideas to compress the display of a large set of discreet alerts. The alerts may be combined according to various business dimensions according to the situation including, for example, the date associated with the alerts, the travel properties associated with the alerts, the length of the booking pickup (i.e., how much business was gained over different previous date ranges), or other parameters. Thus, the alert information may be presented to the user in a compressed format so that the user is not overloaded with excessive alert information.

FIG. 1 is a block diagram illustrating a cloud computing environment for a multi-tenant cloud architecture, according to an embodiment of the present invention. In one embodiment, cloud computing environment 100 includes cloud 110, one or more user devices 120, and one or more property devices 130. User devices 120 and property devices 130 may be used to access the resources of the cloud 110, and may include, for example, personal computers (PCs), workstations, laptop computers, tablet computers, mobile phones, personal digital assistants (PDAs) or the like. In one embodiment, user devices 120 may be personal computing devices used by individuals to shop for or browse travel properties (e.g., hotels, motels, bed and breakfasts, condominiums, houses). Property devices 130 may be computing devices used by property managers, owners, or employees to access demand forecasting, profit maximization or other resources available in cloud 110. Cloud 110 may include a group of networked computing resources accessible to the user devices 120 and property devices 130 over a network, such as a local area network (LAN), a wide area network (WAN), a global area network (GAN) such as the Internet, or a combination of such networks. The resources available in the cloud 110 may include, for example, processing devices, storage devices, applications, or other resources. The cloud 110 allows for a functional separation between the computing resources used, the user devices 120 where a user is working, and the property devices 130 where a property manager or owner is working. The cloud 110 may provide access to a vast network of computing resources and allow individuals to use data or resource intensive applications driven by cloud technology which may or may not be available locally given the limitations of the user devices 120 or the property devices 130.

In one embodiment cloud 110 includes cloud platform 112, travel sessionizer 114, profit optimizer 116, travel alert manager 117, one or more application servers (or application server instances) 118, and one or more storage devices 119. Each of these resources may be located at the same location or at different locations, and may be connected to one another and/or to user devices 120 and property devices 130 through the network, as discussed above. Storage devices 119 may be, for example, memory, such as read-only memory (ROM), flash memory, random access memory (RAM), etc., or mass storage devices, such as a magnetic or optical storage devices, or a combination thereof. In one embodiment, user devices 120 and property devices 130 may interact directly with could platform 112. Cloud platform 112 may include software configured to provide access to the other resources in the cloud 110. Cloud platform 112 may cause the cloud resources, such as application servers 118 or storage devices 119, to appear, for example, as web pages or as virtual machines on user devices 120 or property devices 130.

Cloud platform 112 may pass messages between user devices 120 and property devices 130, and travel sessionizer 114, profit optimizer 116 and travel alert manager 117. In one embodiment, travel sessionizer 114 captures raw event data from the travel shopping actions of users on user devices 120 and parses the raw event data into separate travel sessions. In one embodiment, a travel session includes the shopping, browsing, searching etc., done by one individual (or on one of user devices 120) for travel on a set of similar dates. For example, a travel session may include the searches performed by a user for travel over a certain weekend, or travel within several days of that weekend. The data associated with the search, including, for example, a destination city, specific properties, dates of arrival, length of stay, room type, property amenities, price quotes, availability information, and/or other travel information, may be included in a specific travel session associated with the user. Thus, the data in a given travel session is associated with a single trip. Travel sessionizer 114 may store this travel session data on one of storage devices 119 in cloud 110. If travel sessionizer 114 determines that the user makes additional searches for the same trip, travel sessionizer 114 may add any additional data to the same travel session.

In addition, travel sessionizer 114 may aggregate data from other sources as well. For example, travel sessionizer 114 may receive data, such as pricing information, customer feedback, etc. from a property website which may be hosted on one of application servers 118 or from a third party website which offer bookings at the travel property. Travel sessionizer may also receive property information from competitor property websites. Travel sessionizer 114 may receive data, such as bookings, rate codes (e.g., a unique identifier associated with the rate charged for a particular booking), etc. from a booking engine or a customer relationship management (CRM) system which may be hosted on one of application servers 118. In other embodiments, travel sessionizer 114 may receive data from other sources not explicitly referenced herein. In addition, in other embodiments, the data received from these other sources may include data other than travel data. For example, the principles and techniques described herein may be applied to data in other domains to issue alerts when that data varies from the expected norm. The benefits experienced in these other domains, as a result, may be similar to those described herein for travel data.

In one embodiment, profit optimizer 116 uses the travel session data identified by travel sessionizer 114 to forecast the demand at a given property on a certain date and determine a price for rooms at the property on that date that will increase or optimize the profit. Property managers, owners or employees using property devices 130 can access the findings of profit optimizer 116 and choose to implement the suggested prices in the sale of rooms at the property.

In one embodiment, travel alert manager 117 uses the travel session data identified by travel sessionizer 114 and the forecasts made by profit optimizer 116 to generate and issue travel alerts. The travel alerts may include notifications that can be used by an individual, such as a property manager, owner, employee, etc., to make informed decisions about management of the travel property. For example, the alerts may include a notification of a problem with a certain property or reservation (e.g., no rate is listed on the website, a booking was received with an unknown rate code, bookings for a given date are low, the property is approaching full occupancy) or of a change in one or more competitors properties (e.g., competitors rate deceased, the average market rate decreased).

In one embodiment, travel alert manager 117 receives data from travel sessionizer 114 and determines whether the data includes in-band and/or out-of-band data types. These data types may respectively trigger in-band and out-of-band alerts. In one embodiment, in-band alerts are created and issued during runtime (e.g., immediately upon receipt of the data or relatively soon thereafter), while out-of-band alerts may be created and issued at a later time (e.g., at the end of each day). In-band alerts may be processed based on the received data and a comparison to one or more alert conditions, while out-of-band alerts may include comparison with historical data to determine whether to issue an alert. The travel alert manager 117 may also determine the priority of an alert when determining whether to issue the alert. In one embodiment, alerts designated as high priority may always be issued, while low priority alerts may be held until a later time, or not issued at all depending on the particular configuration. In one embodiment, if certain conditions are met, travel alert manager 117 may generate and issue an alert. The conditions may vary depending on the particular alert or on the type of alert. The conditions may also be specific to the particular travel property with which the alert is associated. In one embodiment, the conditions include one or more thresholds that the received data must meet or exceed in order for an alert to be issued. The conditions may be configurable and/or adjusted by a user in order to satisfy the user's preferences. Additional details regarding travel alert manager 117 will be provided below.

Figure 2:
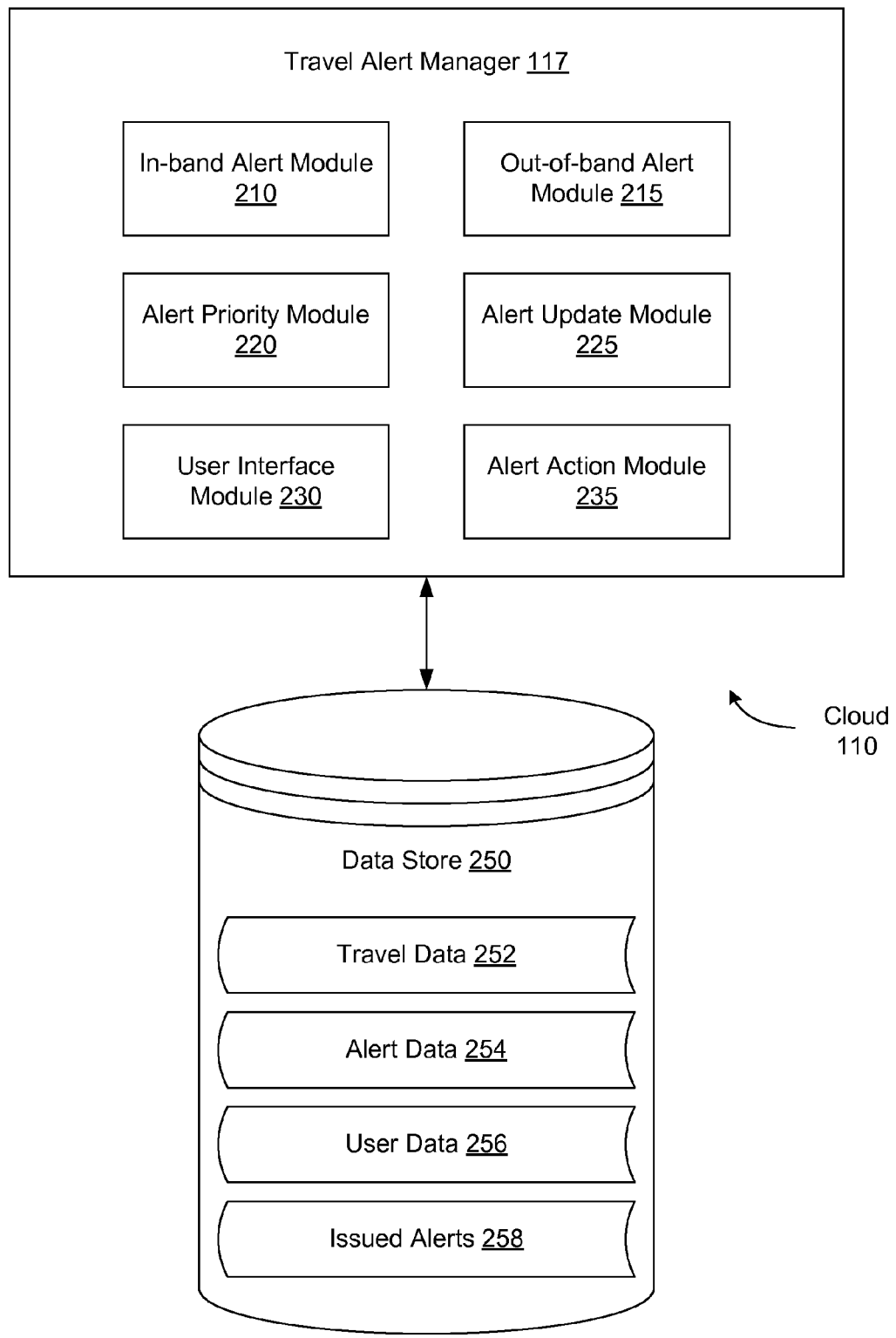
FIG. 2 is a block diagram illustrating a travel alert manager, according to an embodiment.

FIG. 2 is a block diagram illustrating a travel alert manager, according to an embodiment of the present invention. In one embodiment, travel alert manager 117 may be implemented by one of application servers 118 in cloud 110, as shown in FIG. 1. In one embodiment, travel alert manager 117 includes in-band alert module 210, out-of-band alert module 215, alert priority module 220, alert update module 225, user interface module 230 and alert action module 235. In one embodiment, travel alert manager 117 is connected to a data store 250, which may be a file system, database or other data management layer resident on a data storage device, such as one of storage devices 119, and may include a disk drive, RAM, ROM, database, etc.

In one embodiment, in-band alert module 210 identifies in-band alert data types in the data received from travel sessionizer 114. The data may be stored as travel data 252. In one embodiment, in-band alerts are created and issued during a runtime (e.g., as the data is received from external sources, or relatively soon thereafter). In general, an in-band alert may be generated and issued based on the data itself and one or more conditions associated with the alert. For example, if the alert is a property occupancy alert, the data may include the number of bookings for a given day and the condition may be a threshold number of bookings (e.g., the capacity of the property). Another condition of the alert may be a threshold that is slightly less than the capacity of the property (e.g., 5 rooms less than capacity or 90% of capacity). This condition may cause the alert to be issued sooner, so that the property manager is made aware that the property is close to reaching capacity for a particular day. Another condition may exist to notify the property manager that the property has exceeded capacity by a certain amount. In-band alert module 210 may compare the number of bookings to one or more of the thresholds and if the number of bookings equals or exceeds the threshold, the occupancy alert may be triggered. For this in-band alert, there is usually no need to compare the data to other pieces of data, such as historical data (e.g., a historical number of bookings for a particular day). This aspect of the in-band alerts allows the in-band alerts to be processed and issued sooner (e.g., as the data is received) than other types of alerts. The conditions associated with triggering the alerts may be stored as alert data 254 in data store 250.

In addition to the occupancy alert described above, other in-band alerts may include, for example, unknown rate code alerts, no rates on a third party site alerts, individual competitor rate change alerts, competition average rate change alerts, or other alerts. The unknown rate code alert may be triggered when a booking or reservation is received with a rate code that does not match an expected rate code. In one embodiment, when a reservation is received, data associated with the reservation includes a rate code. The rate code may be a unique value that identifies, among other things, the rate charged for the reservation, the property where the reservation is made, and the outlet where the reservation was made (e.g., property website, third party website, telephone). In one embodiment, the condition for the unknown rate code alert may be a list of known, expected or recognized rate codes. When in-band alert module 210 receives a rate code, in-band alert module 210 may compare the rate code against the list of rate codes. If the received rate code is not found on the list of recognized rate codes, in-band alert module 210 may trigger the unknown rate code alert.

The no rates on a third party site alert may be triggered when a rate for a particular property is not available (or is incorrect) on a third party travel site. The third party site may be any travel website that is not directly associated with the property, but offers reservations for the travel property (e.g., Expedia, Orbitz, etc.). Travel sessionizer 114 may periodically poll these third party sites to confirm the property data that is available there. Upon requesting the rate from the third party site, if no rate is received (or an incorrect rate), in-band alert module 210 may trigger the no rate on a third party site alert.

The individual competitor rate change alert may be triggered when a rate for a competitor property changes by a certain amount. The threshold amount may be a percentage change of the previous price (e.g., +/−20%) or a fixed monetary amount. In one embodiment, travel sessionizer 114 may periodically poll competitor sites to ascertain the rates they are currently charging for certain room types. In-band alert module 210 may compare the current rate to a rate previously charged by that competitor to determine a change. If the change meets or exceeds the change threshold, in-band alert module 210 may trigger the individual competitor rate change alert. In one embodiment, if more than one competitor changes their rates on the same day by the threshold amount, rather than issuing individual alerts for each competitor, the alerts may be combined into a single alert. For example, the alert may indicate that the rates for Hotel A, Hotel B and Hotel C have changed by the threshold amount for a given date in the future. In another embodiment, if one competitor changes their rates by the same amount for multiple consecutive days, rather than issuing individual alerts for each day, the alerts may be combined into a single alert. For example, the alert may indicate that the rate for Hotel A on day x, day y and day z have all increased by a given amount. This change may be referred to a change in "rate strategy" for the competitor. Thus, the alert information may be presented to the user in a compressed format so that the user is not overloaded with excessive alert information.

The competition average rate change alert may be triggered when an average rate for the competition of a particular property changes by a certain amount. Again, the threshold amount may be a percentage change of the previous price (e.g., +/−20%) or a fixed monetary amount. In one embodiment, travel sessionizer 114 may periodically poll competitor sites to ascertain the rates they are currently charging for certain room types. The competition may include properties in a similar geographic area to the property and/or be of a similar class (e.g., star rating). In one embodiment, a property manager/owner may select which individual properties or classes of properties are included in the competition properties. In-band alert module 210 may compare the current average rate (or median rate or mode rate) to a rate previously charged by that competitor to determine a change. If the change meets or exceeds the change threshold, in-band alert module 210 may trigger the competition average rate change alert.

In one embodiment, out-of-band alert module 215 identifies out-of-band data types in the data received from travel sessionizer 114. In one embodiment, out-of-band alerts are created and issued after a period of time (e.g., at the end of each day). In general, an out-of-band alert may be generated and issued based on a comparison to saved data, such as historical data associated with the property, in addition to one or more conditions associated with the alert. For example, if the alert is a booking deviation alert, the data may include the number of bookings for a given day in the future and the condition may be a threshold difference when compared to historical bookings for the same date or day of the week. For example of the day in the future (which may be referred to as the day of arrival) is a Friday and is 2 weeks from the current day, the historical data may include the total number of bookings for last Friday that had been received as of 2 weeks before that Friday. In one embodiment, the number of bookings 2 weeks ahead of time may be averaged for some number of previous Fridays (e.g., 12 previous Fridays) to determine the historical data. In one embodiment, the threshold difference may be +/−two standard deviations from the average number of bookings determined from the historical data. In other embodiments, the threshold difference may be some other amount. Out-of-band alert module 215 may compare the difference between the current number of bookings and the historical data to the threshold and if the difference equals or exceeds the threshold, the booking deviation alert may be triggered. Since this out-of-band alert relies on data received throughout the day, in one embodiment, out-of-band alert module 215 may accumulate data over the course of the day and generate and issue the alert once (e.g., at the end of the day).

In addition to the booking deviation alert described above, other out-of-band alerts may include, for example, pickup deviation alerts, lost business deviation alerts, or other alerts. The pickup deviation alert may be triggered when the bookings pickup for a given day differs from historical data by a threshold amount. In one embodiment the pickup is the number of additional bookings received in a given day for a future day of arrival. In one embodiment, for ease of explanation, the future day may be referred to as the "day of arrival" or the "arrival day," although it should be understood that a guest need not necessarily arrive at the property on that day, but rather just make a reservation for that day/night. For example, the guest may have checked-in to the property on an earlier day, but their stay includes the "day of arrival." Thus, if the day of arrival is a Friday two weeks from today, the pickup may include the number of additional bookings received today for a stay at the associated property on that Friday. In this embodiment, the historical data may include the number of additional bookings received for last Friday, on a day 2 weeks before that Friday. In one embodiment, the number of additional bookings received 2 weeks ahead of time may be averaged for some number of previous Fridays (e.g., 12 previous Fridays) to determine the historical data. In one embodiment, the threshold difference may be +/−two standard deviations from the average number of additional bookings determined from the historical data (i.e., the pickup). In other embodiments, the threshold difference may be some other amount. Out-of-band alert module 215 may compare the difference between the received number of bookings and the historical data to the threshold and if the difference equals or exceeds the threshold, the pickup deviation alert may be triggered. In one embodiment, the pickup over multiple days may be analyzed together. For example, the pickup may be defined as the number of additional bookings received in the last 1, 3, 7 or 15 days. A separate alert may be issued for each of these pickups. In one embodiment, if more than one pickup deviates from the historical average (e.g., the 3 day and 7 day pickups are both higher than normal), rather than issuing individual alerts for each pickup, the alerts may be combined into a single alert. For example, the alert may indicate that the both the 3 day and 7 day pickups are high for a given date in the future. In another embodiment, if the same pickup (e.g., the 1 day pickup) increases for some number of consecutive days, rather than issuing individual alerts for each day, the alerts may be combined into a single alert. For example, the alert may indicate that the 1 day pickup is higher than normal for day x, day y and day z. Thus, the alert information may be presented to the user in a compressed format so that the user is not overloaded with excessive alert information.

In one embodiment, the lost business deviation alert is triggered when the lost business data, including regrets and denials, differs from historical data by a threshold amount. A regret occurs when an individual is offered a property on a given night for a certain price, but for some reason does not actually book the property. In one embodiment, a regret is recorded right away and later removed if the individual books the property. A denial occurs when the individual expresses an interest in booking a property on a given night, but is unable to do so, because, for example, the property is sold out or the requested room type is unavailable. This lost business data may be indicative of the demand for a certain property, which may not normally be reflected in the booking data for the property. In one embodiment, travel sessionizer analyzes user shopping data to determine the number of regrets and denials recorded today for a given day in the future. The historical data may include the number of regrets and denials recorded for the same day of the week in previous weeks. In one embodiment, the threshold difference may be +/−two standard deviations from the average number of regrets and denials determined from the historical data. In other embodiments, the threshold difference may be some other amount. Out-of-band alert module 215 may compare the difference between the received number of regrets and denials and the historical data to the threshold and if the difference equals or exceeds the threshold, the lost business deviation alert may be triggered.

In one embodiment, alert priority module 220 identifies a priority of the alerts and determines whether to issue the alerts based on the priority. Alerts may be classified, for example, as high priority or low priority. In other embodiments, there may be additional and/or different priority classifications. In general, a high priority alert is an alert that the user desires to see immediately (or at least relatively soon), while a low priority alert can be delayed until a later time, if the user so desires. Examples of high priority alerts may include the no rate on third party site alert, occupancy alert, competitor average rate change alert, or other alerts. Examples of low priority alerts may include the pickup deviation alert, booking deviation alert, competitor rate change alert, lost business deviation alert, or other alerts. Alert priority module 220 may determine an indication of the priority of a particular alert by reading a corresponding entry in alert data 254.

In one embodiment, alert priority module 220 may alter the way an alert is issued based on the priority. For example, user interface module 230 may generate and provide a property management application that a property owner/manager can use to manage the pricing of their property. In one embodiment, the property management application may be used to manage multiple properties. In general, one property that the user is currently viewing, interacting with, or otherwise managing may be considered to be the "active property." In one embodiment, if the user is not currently using the application, the last property that the user viewed is the active property. The additional properties may be in the background and considered secondary or inactive. According the user settings and configurations (which may be stored as user data 256), in one embodiment, alert priority module 220 may generate and issue high priority alerts for all properties associated with the application, including both active and inactive properties. In this embodiment, alert priority module 220 may issue low priority alerts for the active property, but not for the inactive properties. The low priority alerts for the inactive properties may be issued once those properties become the active property (e.g., by the user selecting or viewing that property in the management application). In other embodiments, the user may select to not receive low priority alerts for any property until they are specifically requested. In another embodiment, high priority alerts may be received in different formats, such as via a notification in an alert pane of the user interface from the management application, via pop-up window, via electronic mail (email), via text message, etc. to ensure that the user receives the alert. As described above, all of these options may be configurable by the user. The priority classification of the alerts serves as one way to distinguish different alerts so that the user can decide when and how to receive those alerts so that the user may more effectively manage their travel properties.

In one embodiment, alert update module 225 can detect if an alert has been previously issued and determine whether to issue an update to that previously issued alert. For example, in-band alert module 210 or out-of-band alert module 215 may issue an alert according to the conditions described above. Once that alert is issued, a record may be stored in issued alerts 258. In some cases, the same conditions may be met again in the future (e.g., the next day or the next time data is received). For example, if the booking deviation is lower than normal one day, unless there is an increase in bookings, it may be low again the next day, and the next, etc. A user, however, may not wish to receive the booking deviation alert over and over. Thus, alert update module 225 can monitor previously issued alerts and determine whether to update the alerts based on a secondary condition that may be different that the first or primary condition used by in-band alert module 210 or out-of-band alert module 215 when first issuing the alert.

In one embodiment, for the booking deviation alert, the primary condition was a change of +/−two standard deviations from the mean. In one embodiment, alert update module 225 may update the alert based on a secondary condition including, for example, every point above or below the previous threshold unless the deviation is moving back towards the average. In one embodiment, the updated alert may be sent in the same fashion as the original alert, but may include an indication that it is an update. In other embodiments, the updated alerts may be sent in a different fashion (e.g., mobile alert as opposed to the original email alert). In one embodiment, alert update module 225 may use the same secondary condition for the booking deviation alert, the pickup deviation alert and the lost business deviation alert. In other embodiments, different secondary conditions may be used. The secondary conditions, may be predefined by alert update module 225 or may be configured and adjusted by the property owner or property manager.

In one embodiment, for the competitor rate change alert and the competition average rate change alert, the primary conditions are a change of +/−20% of the previous rate. In one embodiment, alert update module 225 may update these alerts based on a secondary condition including, for example, increments of +/−20% from the most recent rate. In one embodiment, for the occupancy alert, the primary condition may be bookings totaling 95% of capacity of the property. In one embodiment, alert update module 225 may update the occupancy alert based on secondary conditions including, for example, 100% of capacity and 105% of capacity. In other embodiments, some other secondary conditions may be used. In one embodiment, alert update module 225 determines whether a newly triggered alert could be combined with a previously issued alert on the basis of the having same or consecutive dates, being associated with the same property, etc. For example, if one competitor rate change alert was issued and then another competitor rate change alert for the following day was triggered, alert update module 225 can remove the previous alert from the alert feed and issue a new combined alert for both days. Similarly, this same combination may be done for the other alert types described herein.

In one embodiment, user interface module 230 generates and provides a user interface through which travel alerts may be provided. In one embodiment, the user interface may be part of a property management application that a property owner/manager can use to manage the pricing of their property or multiple properties. The application may include various tabs, windows, views, screens, etc. that display different pieces of information about the property, such as pricing data, demand forecasts, bookings, etc. In addition, user interface module 230 may provide an alert feed panel, a side alert notification panel, a scrolling alert bar, or alert pop-up windows, etc. as part of the property management application. When an alert is triggered and issued, user interface module 230 may display an indication of the alert in one of these places. The alert may include for example, an icon or an image, which may be accompanied by an alert heading or title, a description of the alert, and an indication of the property and priority associated with the alert.

In one embodiment, user interface module 230 provides the alerts in some other fashion besides directly within a property management application. For example, user interface module 230 may generate an email that is sent to a user each time an alert is generated or once a day including all of the alerts issued during that day. User interface module 230 may also generate mobile alerts such as a text message (i.e. SMS message) or as a notification in a mobile property management application. The mobile property management application may be accessed using a mobile computing device, such as a smartphone, tablet, netbook, etc., and may include push notifications to display alerts as they are received. The mobile property management application may display a summary of the alerts or may display the same information as included in an alert on the full property management application.

In one embodiment, alert action module 235 determines whether an alert is actionable. For example, upon receiving an indication that an alert should be issued, alert action module 235 can read alert data 254 to determine if there is a corrective action associated with an alert. If there an associated corrective action, when the alert is issued, alert action module 235 may include an alert action link in the alert. The alert action link may provide a solution to correct the situation or problem that triggered the alert. If the user selects the alert action link, alert action module 235 may perform the corrective action in order to remedy the situation. Each corrective action may be specific to the associated alert. In addition, alert action module 235 may determine if there is a custom display associated with an alert. The custom display may include a specific page or resource that is designed to view or interact with data associated with the alert. For example, the occupancy alert may have an associated page or screen that is designed for viewing occupancy data at the travel property on the day in question. Other alerts may have similar pages. If alert action module 235 determines that there is an associated custom display, alert action module 235 may include a link to the associated page in the alert, which can direct the user to the page upon selection of the link.

In one embodiment, the alert action link may be a hyperlink designed to display a particular page, window, screen, etc. in the property management application. For example, if the alert is specific to a particular day in the future, the alert action link may direct the user to a home page for that particular day. On the home page, the interface may include controls to allow the property owner/manager to make adjustments to the property rate or other attributes. In another embodiment, the alert action link may have a default action associated with it designed to correct the situation that triggered the alert. For example, if the occupancy alert is triggered (indicating that the property is approaching full occupancy for a particular day), the alert action link may increase the rate for the property on that day. Upon receiving a selection of the alert action link by a user, alert action module 235 may automatically update the property rate for that day without receiving further user input. In another embodiment, if the booking deviation alert is triggered (indicating that bookings for a particular day are lower than normal), the alert action link may automatically decrease the rate for that day by a certain amount. In other embodiments, the default action associated with the alert action link may be specific to the particular alert. In addition, the default action may be configured by a user to suit their particular needs.

Figure 3:
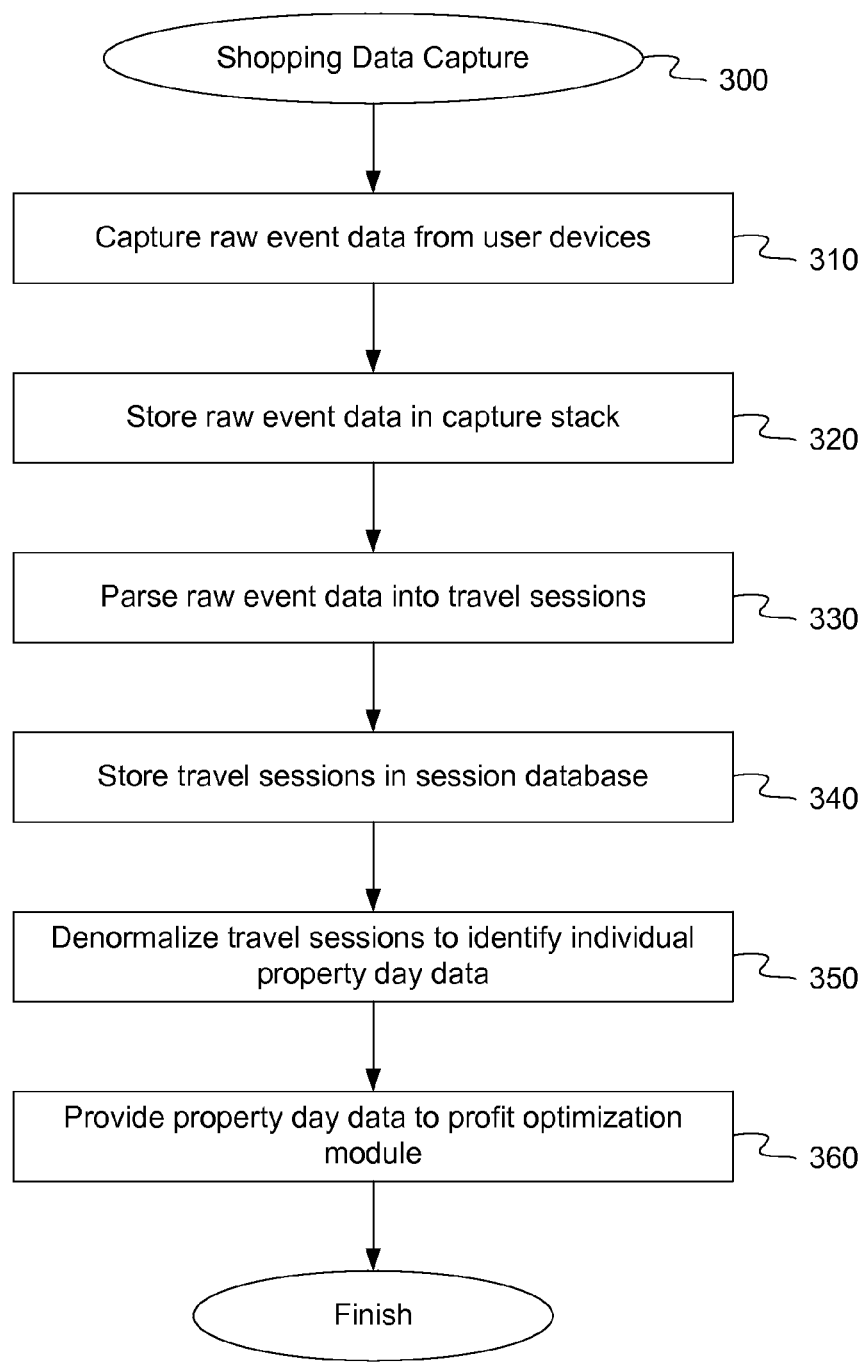
FIG. 3 is a flow diagram illustrating a shopping data capture method, according to an embodiment.

FIG. 3 is a flow diagram illustrating a shopping data capture method, according to an embodiment of the present invention. The method 300 may be performed by processing logic that comprises hardware (e.g., circuitry, dedicated logic, programmable logic, microcode, etc.), software (e.g., instructions run on a processor to perform hardware simulation), or a combination thereof. The processing logic is configured to capture travel shopping data from individual users. In one embodiment, method 300 may be performed by travel sessionizer 114, as shown in FIG. 1.

Referring to FIG. 3, at block 310, method 300 captures raw event data from user devices. In one embodiment, travel sessionizer 114 captures raw event data from users who are shopping, browsing, searching, etc. for travel on one of user machines 120. If a user is searching for a property using a travel website running in a web browser, the web browser may use cookies or some other tracking mechanism to capture the raw event data. The raw event data may include an indication of the criteria that the user puts into each travel search. For example, the raw event data may include a destination city, specific properties, date of arrival, length of stay, room type, property amenities, price quotes, availability information, and/or other travel information. The web browser may transmit these cookies to travel sessionizer 114. At block 320, method 300 stores the raw event data in a capture stack in data store 250.

At block 330, method 300 parses the raw event data into separate travel sessions. In one embodiment, travel sessionizer 114 parses the raw event data in the capture stack into individual travel sessions. In one embodiment, a travel session includes the shopping, browsing, searching etc., done by one individual (or on one of user devices 120) for travel on a set of similar dates. For example, travel sessionizer 114 may associate all searches done from a single user device 120, with one individual. The data component of the travel session may be based upon the dates for which the user is searching for travel information. At block 340, method 300 stores the travel data corresponding to each travel session in a session database of data store 250.

At block 350, method 300 denormalizes the travel session data to identify individual property day data. In one embodiment, travel sessionizer 114 denormalizes the data in the session database to determine the number of regrets and denials for a given property on a certain day. Travel sessionizer 114 may read each entry in the session database to determine if there are any regrets or denials indicated. For each regret or denial, travel sessionizer 114 may increment a count value for an entry in a property day data. In the property day data, there may be a separate entry for each day at each property. The values in each entry represent the number of regrets and denials determined for the associated day at the associated property. At block 360, method 300 provides the property day data to profit optimizer 116, or to another application running on one of application servers 118 or elsewhere, for additional processing.

Figure 4:
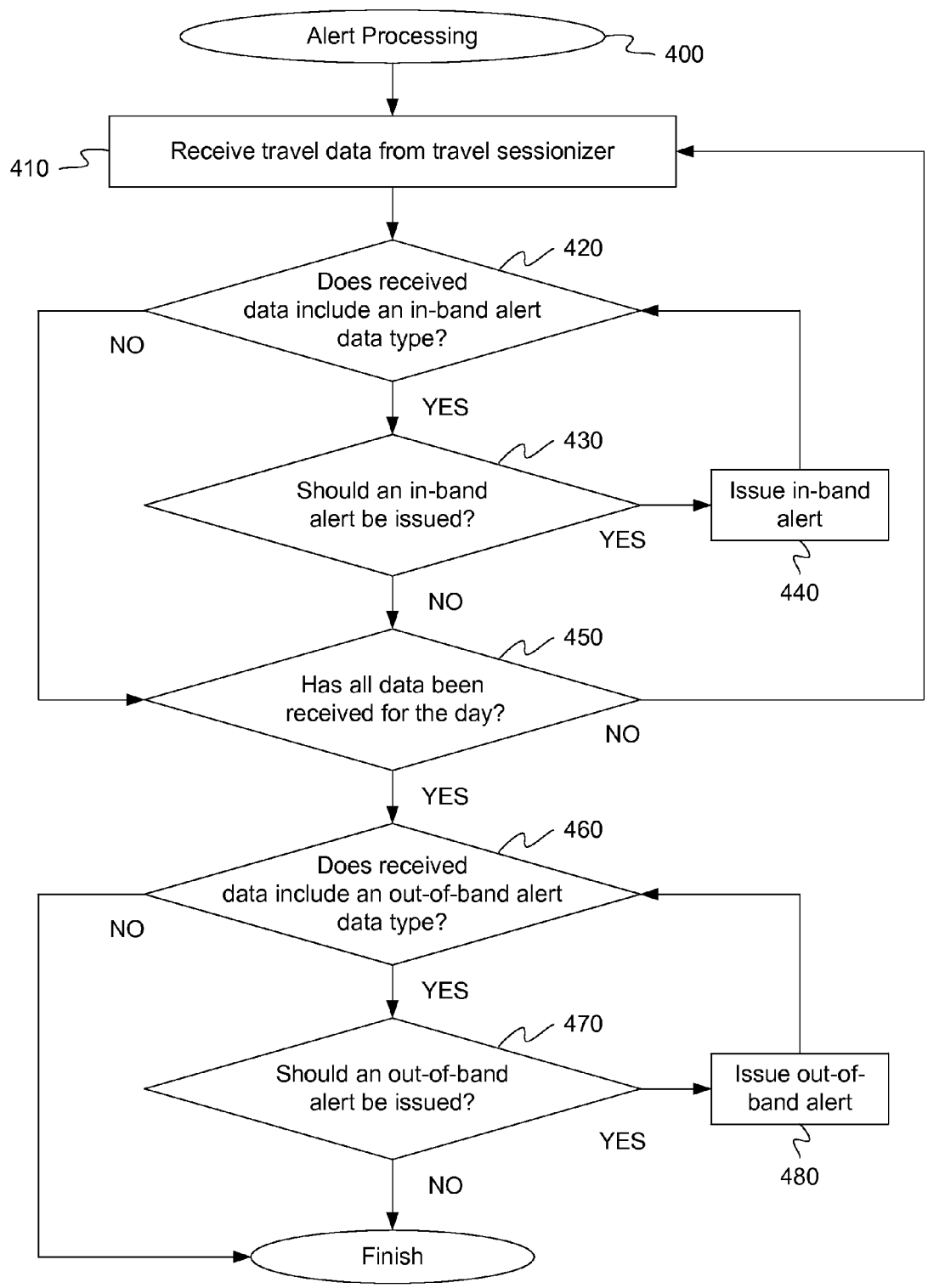
FIG. 4 is a flow diagram illustrating a travel alert processing method, according to an embodiment.

FIG. 4 is a flow diagram illustrating a travel alert processing method, according to an embodiment. The method 400 may be performed by processing logic that comprises hardware (e.g., circuitry, dedicated logic, programmable logic, microcode, etc.), software (e.g., instructions run on a processor to perform hardware simulation), or a combination thereof. The processing logic is configured to generate and issue travel alerts to notify a property manager about the state of the property. In one embodiment, method 400 may be performed by travel alert manager 117, as shown in FIGS. 1 and 2.

Referring to FIG. 4, at block 410, method 400 receives travel data 252 from travel sessionizer 114. In one embodiment the receipt of the travel data 252 triggers the start of alert processing method 400. In another embodiment, travel alert manager 117 may initiate alert processing method 400 on a periodic basis to process travel data 252 received since the last time method 400 was run.

At block 420, method 400 determines whether the received data includes an in-band alert data type. In one embodiment, in-band alert module 210 reads travel data 252 to determine what data has been received and compares that data to a list of known in-band data types. In one embodiment, the known in-band data types include unknown rate codes, no rates on third party sites, occupancy data, competitor rate change data, competition average rate change data, or other data. The in-band data types may be listed in alert data 254. If no in-band alert data types are found, method 400 may proceed to block 450.

Figure 5:
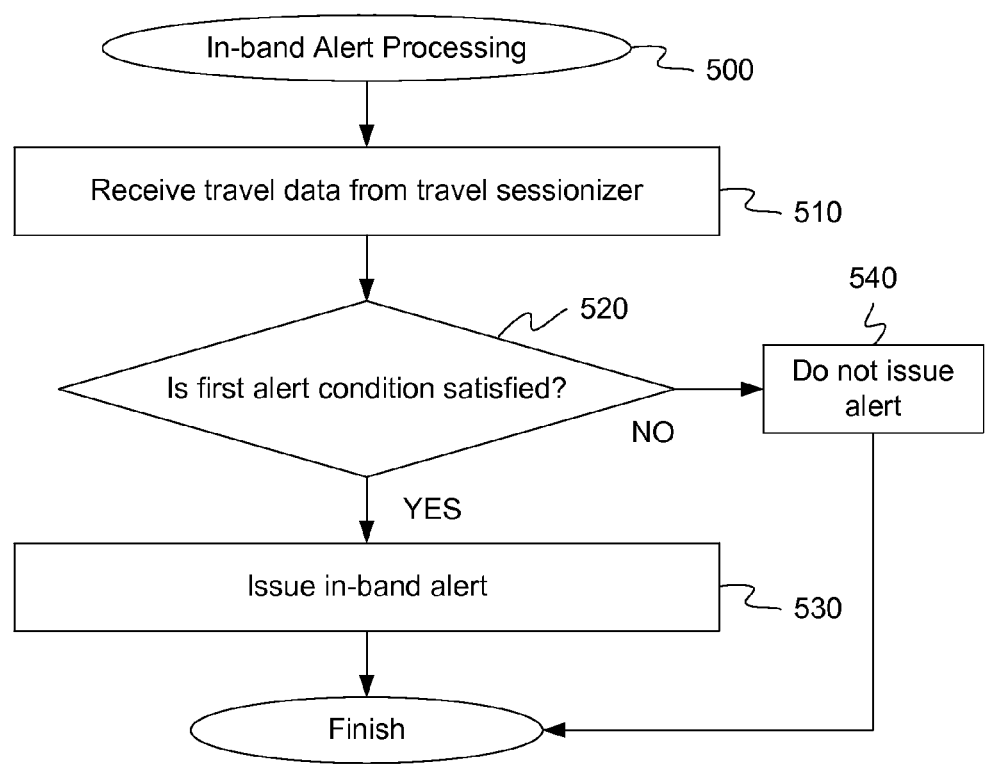
FIG. 5 is a flow diagram illustrating an in-band alert processing method, according to an embodiment.

If at block 420, method 400 determines that the received data includes an in-band alert data type, at block 430, method 400 determines whether an in-band alert should be issued. FIG. 5 describes a method 500 for processing in-band alerts. Details of how in-band alert module 210 determines whether an in-band alert should be issued are described below. If at block 420, method 400 determines that an in-band alert should be issued, at block 440, method 400 issues an in-band alert.

If at block 430, method 400 determines that an in-band alert should not be issued, at block 450, method 400 determines whether all travel data has been received for the day. In one embodiment, the day is defined by a 24 hour period beginning at 12 am local time where the property is located. In other embodiments, the day may be defined using some other time (e.g., beginning at 2 am). Each piece of received data may include a time stamp indicating when it was received. In one embodiment, upon reaching the time defining the end of the day, travel alert manager 117 may accumulate all the travel data 252 that was received during that day. Once the time defining the end of the day has been reached, travel alert manager 117 may determine that it will not be receiving any additional travel data for that day.

If at block 450, method 400 determines that all the travel data has been received for the day, at block 460, method 400 determines whether the received data includes an out-of-band alert data type. In one embodiment, out-of-band alert module 215 reads travel data 252 to determine what data has been received and compares that data to a list of known out-of-band data types. In one embodiment, the known out-of-band data types include pickup deviation data, booking deviation data, lost business deviation data, or other data. The out-of-band data types may be listed in alert data 254.

Figure 6:
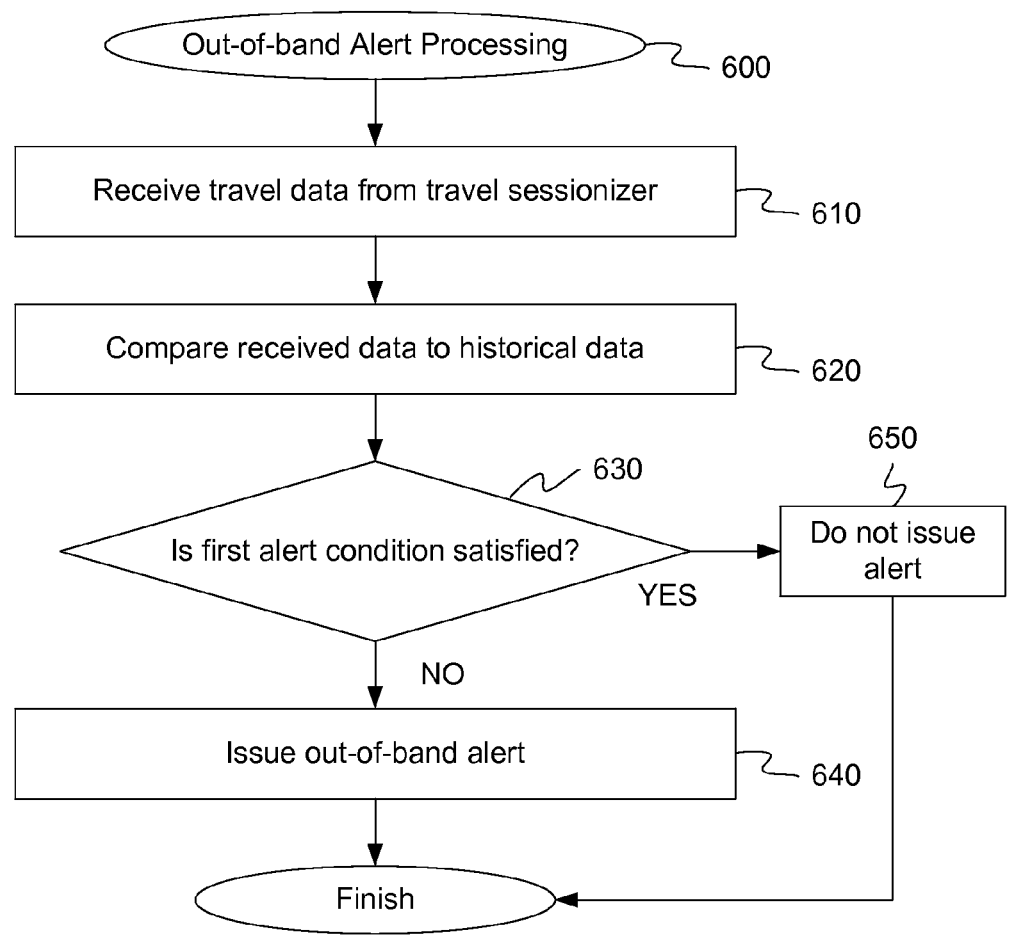
FIG. 6 is a flow diagram illustrating an out-of-band alert processing method, according to an embodiment.

If at block 460, method 400 determines that the received data includes an out-of-band alert data type, at block 470, method 400 determines whether an out-of-band alert should be issued. FIG. 6 describes a method 600 for processing out-of-band alerts. Details of how out-of-band alert module 215 determines whether an out-of-band alert should be issued are described below. If at block 470, method 400 determines that an out-of-band alert should be issued, at block 480, method 400 issues the out-of-band alert.

FIG. 5 is a flow diagram illustrating an in-band alert processing method, according to an embodiment. The method 500 may be performed by processing logic that comprises hardware (e.g., circuitry, dedicated logic, programmable logic, microcode, etc.), software (e.g., instructions run on a processor to perform hardware simulation), or a combination thereof. The processing logic is configured to generate and issue an in-band travel alert. In one embodiment, method 500 may be performed by travel alert manager 117, as shown in FIGS. 1 and 2.

Referring to FIG. 5, at block 510, method 500 receives travel data 252 from travel sessionizer 114. In one embodiment the receipt of the travel data 252 triggers the start of in-band alert processing method 500. In another embodiment, travel alert manager 117 may initiate in-band alert processing method 500 on a periodic basis to process travel data 252 received since the last time method 500 was run.

At block 520, method 500 determines if a first alert condition is satisfied. In one embodiment, in-band alert module 210 identifies the condition or conditions corresponding to the received data type from alert data 254. In one embodiment, the condition may be a threshold value that if met by the received travel data 252 triggers the issuance of the in-band alert. For example, for the unknown rate code alert, the condition may be whether the rate code is unrecognized and for the no rate on a third party alert, the condition may be whether a rate is missing or incorrect on the third party site. For an occupancy alert, the condition may be whether the bookings for a property on a given day have reached a certain percentage of the occupancy (e.g., 90%). For other alerts, such as competitor rate change and competition average rate change, the condition may be whether the rates have change by a certain amount (e.g., +/−20%) since the last reading. These conditions may be default values used by in-band alert module 210 or may be configurable by the user and stored as user data 256.

If at block 520, method determines that the first alert condition is satisfied, at block 530, method 500 issues the in-band alert. In one embodiment, user interface module 230 displays the alert in an alert feed panel, side alert notification panel, pop-up window or other area in a property management application. The user interface module 230 may also generate an email message including the alert or issue a mobile alert, such as a text message or a push notification on a mobile device. In one embodiment, the alert may include an alert title and description, an indication of a priority, and indication of the property and day with which the alert is associated and optionally an alert action link. If at block 520, method 400 determines that the first alert condition is not satisfied, at block 540, method 500 does not issue an in-band alert.

FIG. 6 is a flow diagram illustrating an out-of-band alert processing method, according to an embodiment. The method 600 may be performed by processing logic that comprises hardware (e.g., circuitry, dedicated logic, programmable logic, microcode, etc.), software (e.g., instructions run on a processor to perform hardware simulation), or a combination thereof. The processing logic is configured to generate and issue out-of-band travel alerts. In one embodiment, method 600 may be performed by travel alert manager 117, as shown in FIGS. 1 and 2.

Referring to FIG. 6, at block 610, method 600 receives travel data 252 from travel sessionizer 114. In one embodiment the receipt of the travel data 252 triggers the start of out-of-band alert processing method 600. In another embodiment, travel alert manager 117 may initiate out-of-band alert processing method 600 on a periodic basis to process travel data 252 received since the last time method 600 was run.

At block 620, method 600 compares the received data to stored historical data. In one embodiment, travel data 252 includes historical data from the same properties that was received in the past. Out-of-band alert module 215 can identify that historical data for comparison to the recently received data. In general, out-of-band alerts may be based on a comparison to the historical data. Thus, in one embodiment, out-of-band alert module 215 compares the received data to the historical data. For example, for the pickup deviation, booking deviation and lost business deviation alerts, out-of-band alert module 215 compares the pickup data, booking data and lost business data to the corresponding historical data respectively, to determine a difference between the recently received data and the historical data.

At block 630, method 600 determines if a first alert condition is satisfied. In one embodiment, out-of-band alert module 215 identifies the condition or conditions corresponding to the received data type from alert data 254. In one embodiment, the condition may be a threshold value that if met by the received travel data 252 triggers the issuance of the out-of-band alert. For example, for the pickup deviation, booking deviation and lost business deviation alerts, the condition may be a threshold change when compared to the average values from the historical data (e.g., +/−2 standard deviations from the mean). These conditions may be default values used by out-of-band alert module 215 or may be configurable by the user and stored as user data 256.

If at block 630, method determines that the first alert condition is satisfied, at block 640, method 600 issues the out-of-band alert. In one embodiment, user interface module 230 displays the alert in an alert feed panel, side alert notification panel, pop-up window or other area in a property management application. The user interface module 230 may also generate an email message including the alert or issue a mobile alert, such as a text message or a push notification on a mobile device. In one embodiment, the alert may include an alert title and description, an indication of a priority, and indication of the property and day with which the alert is associated and optionally an alert action link. If at block 630, method 600 determines that the first alert condition is not satisfied, at block 650, method 600 does not issue an out-of-band alert.

Figure 7:
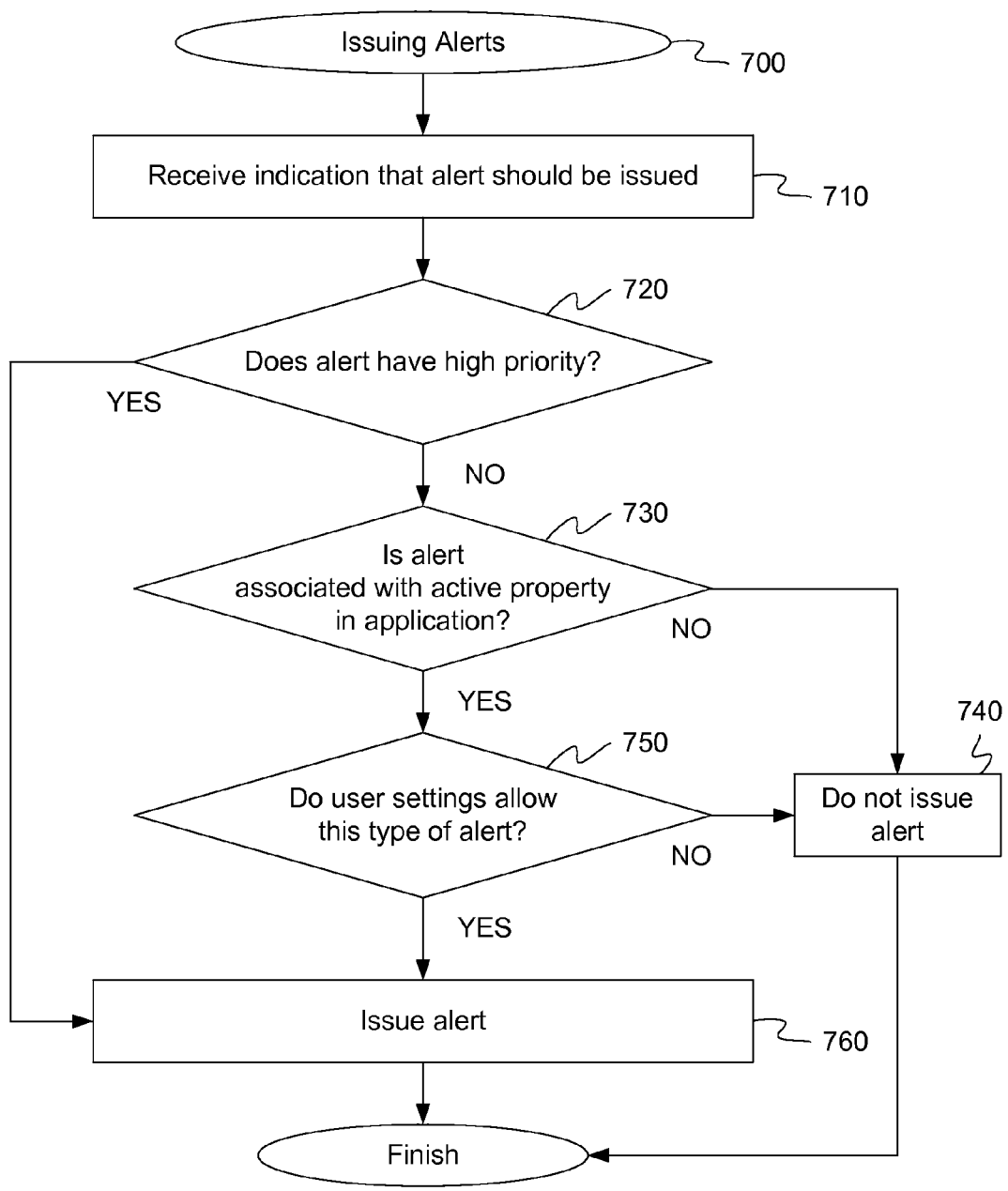
FIG. 7 is a flow diagram illustrating a method for issuing travel alerts, according to an embodiment.

FIG. 7 is a flow diagram illustrating a method for issuing travel alerts, according to an embodiment. The method 700 may be performed by processing logic that comprises hardware (e.g., circuitry, dedicated logic, programmable logic, microcode, etc.), software (e.g., instructions run on a processor to perform hardware simulation), or a combination thereof. The processing logic is configured to determine a priority of a travel alert and determine whether to issue the travel alert based on the priority. In one embodiment, method 700 may be performed by travel alert manager 117, as shown in FIGS. 1 and 2.

Referring to FIG. 7, at block 710, method 700 receives an indication that an alert should be issued. In one embodiment, alert priority module 220 receives an indication from either in-band alert module 210 or out-of-band alert module 215 that based on the comparison to the alert conditions, an alert should be issued.

At block 720, method 700 determines whether the alert has a high priority. In one embodiment, alert priority module 220 compares the alert type to alert data 254. The alert data 254 may include an indication of which alerts are considered high priority (e.g., no rate on third party site, occupancy, competition average rate change) and which are considered low priority (e.g., pickup deviation, booking deviation, lost business deviation, competitor rate change). If at block 720, method 700 determines that the alert has a high priority, at block 760 method 700 issues the alert.

If at block 720, method 700 determines that the alert does not have a high priority, at block 730, method 700 determines whether the alert is associated with an active property in a property management application. In one embodiment, the property management application may be used to manage multiple properties. In general, one property that the user is currently viewing, interacting with, or otherwise managing may be considered to be the "active property." In one embodiment, if the user is not currently using the application, the last property that the user viewed is the active property. The additional properties may be in the background and considered secondary or inactive. In one embodiment, alert priority module 220 may query user interface module 230 to determine which property is active and compare the active property to a property associated with the alert.

If at block 730, method 700 determines that the alert is not associated with the active property, at block 740, method 700 does not issue the alert. The alert may be saved as alert data 254 and issued at a later time, once the property associated with the alert because the "active property."

If at block 730, method 700 determines that the alert is associated with the active property, at block 750, method 700 determines whether the user settings allow the current type of alert. In one embodiment, user data 256 include the configuration settings saved by the property owner or manager regarding what types of alerts they wish to receive. For example, the user may specify that they only want to receive certain types of alerts at certain times or that there are other types of alerts they do not wish to receive. In addition, the user may specify that certain alerts which are normally classified as high priority alerts actually be issued as low priority alerts, or vice versa. In one embodiment, alert priority module 220 reads user data 256 to determine whether the user settings allow the current type of alert.

If at block 750, method 700 determines that the user settings do not allow the type of alert, at block 740, method 700 does not issue the alert. If at block 750, method 700 determines that the user settings allow the type of alert, at block 760, method 600 issue the alert.

Figure 8:
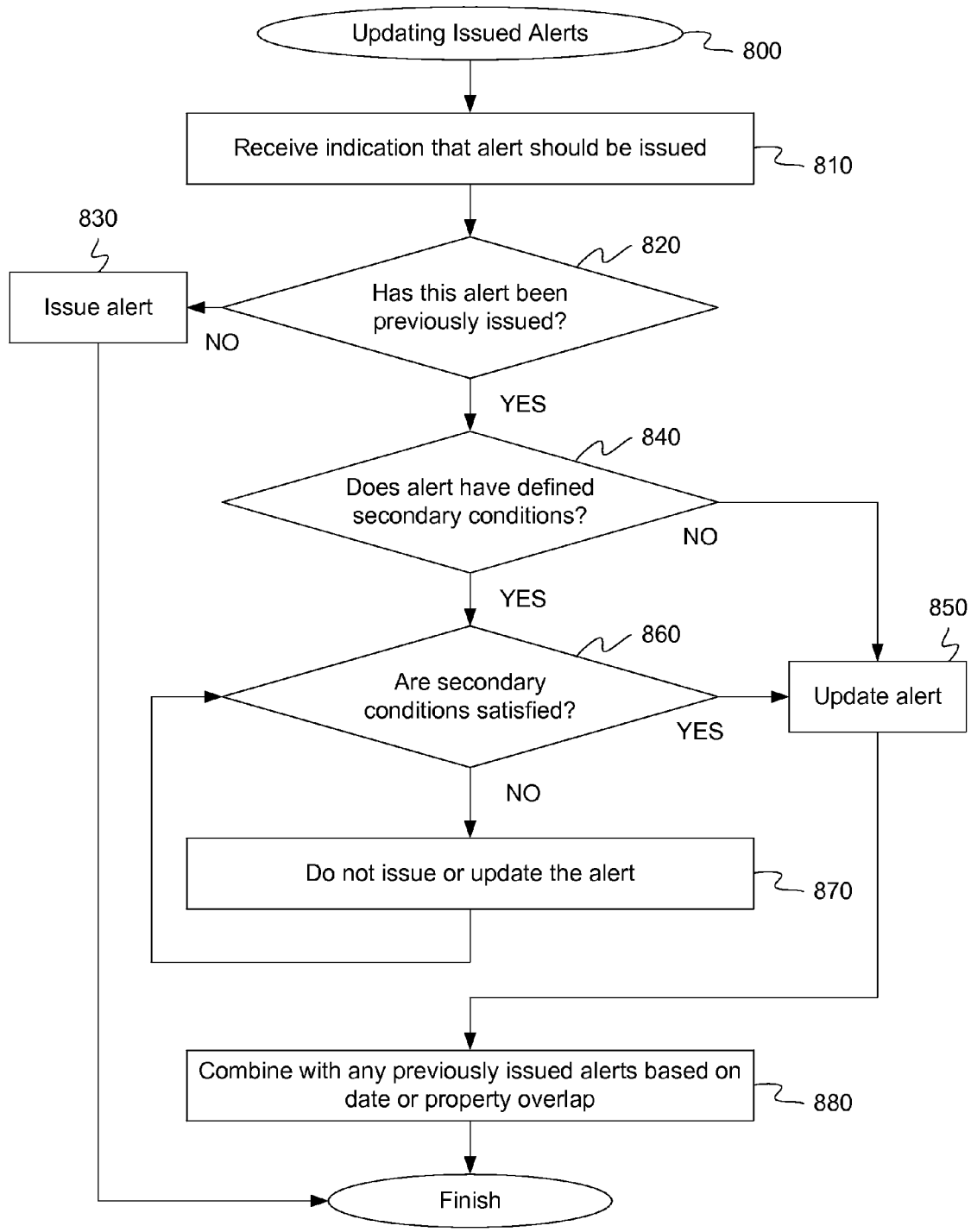
FIG. 8 is a flow diagram illustrating a method for updating previously issued alerts, according to an embodiment.

FIG. 8 is a flow diagram illustrating a method for updating previously issued alerts, according to an embodiment. The method 800 may be performed by processing logic that comprises hardware (e.g., circuitry, dedicated logic, programmable logic, microcode, etc.), software (e.g., instructions run on a processor to perform hardware simulation), or a combination thereof. The processing logic is configured to update and reissue previously issued travel alerts. In one embodiment, method 800 may be performed by travel alert manager 117, as shown in FIGS. 1 and 2.

Referring to FIG. 8, at block 810, method 800 receives an indication that an alert should be issued. In one embodiment, alert update module 225 receives an indication from either in-band alert module 210 or out-of-band alert module 215 that based on the comparison to the alert conditions, an alert should be issued. The indication may also be based on the alert priority determined by alert priority module 220.

At block 820, method 800 determines if this alert has been previously issued. In one embodiment, alert update module 225 compares an identifier of the alert to a list of previously issued alerts 258. Previously issued alerts 258 may include alerts that were issued by in-band alert module 210, out-of-band alert module 215 or alert priority module 220. In one embodiment, each issued alert has an expiration time (e.g., 7 days) which specifies how long it is to remain in the list of issued alerts 258. In one embodiment, alert update module may ignore and or delete issued alerts that have reached the expiration time. If at block 820, method 800 determines that the alert has not been previously issued, at block 830, method 800 issues the alert.

If at block 820, method 800 determines that the alert has been previously issued, at block 840, method 800 determines whether the alert has defined secondary conditions. For example, a secondary condition may be different than the first or primary condition used by in-band alert module 210 or out-of-band alert module 215 when initially issuing the alert. In one embodiment, alert update module 225 may read alert data to determine if there are any secondary conditions listed for the current alert type.

If at block 840, method 800 determines that the alert does not have any secondary conditions, at block 850, method 800 updates the alert. In one embodiment, alert update module 225 updates a record for the alert in the issued alerts 258 to show that the alert has been reissued at a new time. In one embodiment, the updated alert may be sent in the same fashion as the original alert, but may include an indication that it is an update. In other embodiments, the updated alerts may be sent in a different fashion (e.g., mobile alert as opposed to the original email alert).

If at block 840, method 800 determines that the alert does have secondary conditions, at block 860, method 800 determines whether the secondary conditions are satisfied. In one embodiment, alert update module 225 may compare the received travel data 252 to the thresholds defined by the secondary condition. For example, for the booking deviation alert, the primary condition was a change of +/−two standard deviations from the mean. In one embodiment, the secondary condition may include every point above or below the previous threshold unless the deviation is moving back towards the average. Each alert may have its own defined secondary conditions in alert data 254. If at block 860, method 800 determines that the secondary conditions are satisfied, at block 850, method 800 updates the alert.

If at block 860, method 800 determines that the secondary conditions are not satisfied, at block 870, method 800 does not issue or update the alert. Rather method 800 continues to monitor the alert to determine if the secondary conditions are satisfied at block 860. In this manner, the user is not inundated with repetitive alerts. At block 880, method 800 combines the alert with any previously issued alerts on the basis of an overlap in date or property associated with the alerts. For example, if one competitor rate change alert was issued and then another competitor rate change alert for the following day was triggered, alert update module 225 can remove the previous alert from the alert feed and issue a new combined alert for both days. The combined alert may be issued based on the first alert and the second alert having at least one alert parameter in common (e.g., they are both for the same competitor property). The first alert and the second alert also have at least one unique alert parameter (i.e., they are for different days), which is why they were generated as separate alerts in the first place. The alert parameters may include for example, the day for which the alert was issued, the travel property associated with the alert, the length of the booking pickup, or other parameters, as described above. Thus, the alert information may be presented to the user in a compressed format so that the user is not overloaded with excessive alert information.

Figure 9:
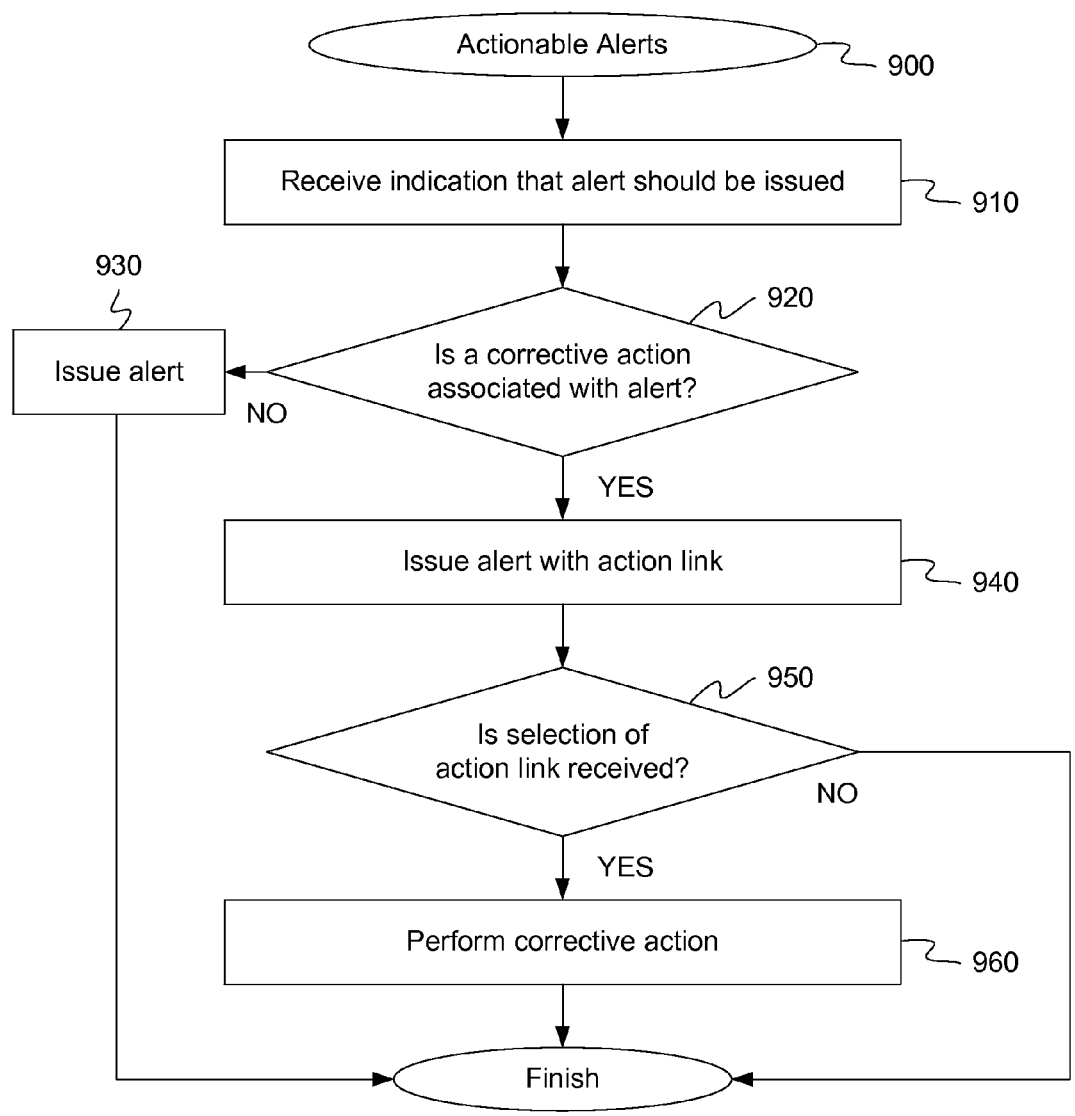
FIG. 9 is a flow diagram illustrating a method for issuing actionable alerts, according to an embodiment.

FIG. 9 is a flow diagram illustrating a method for issuing actionable alerts, according to an embodiment. The method 900 may be performed by processing logic that comprises hardware (e.g., circuitry, dedicated logic, programmable logic, microcode, etc.), software (e.g., instructions run on a processor to perform hardware simulation), or a combination thereof. The processing logic is configured to provide an alert action link with a travel alert and perform a corrective action in response to a selection of the alert action link by a user. In one embodiment, method 900 may be performed by travel alert manager 117, as shown in FIGS. 1 and 2.

Referring to FIG. 9, at block 910, method 900 receives an indication that an alert should be issued. In one embodiment, alert action module 235 receives an indication from either in-band alert module 210 or out-of-band alert module 215 that based on the comparison to the alert conditions, an alert should be issued. The indication may also be based on the alert priority determined by alert priority module 220.

At block 920, method 900 determines whether a corrective action is associated with the alert. In one embodiment, alert action module 235 determines whether an alert is actionable. For example, upon receiving an indication that an alert should be issued, alert action module 235 can read alert data 254 to determine if there is a corrective action associated with an alert. Each entry in alert data 254 may have an indication of whether or not a corrective action is associated with the alert. If at block 920, method 900 determines that there is no corrective action associated with the alert, at block 930, method 900 issues the alert without any alert action link.

If at block 920, method 900 determines that there is a corrective action associated with the alert, at block 940, method 900 issues the alert with an alert action link. The alert action link may provide a solution to correct the situation or problem that triggered the alert. In one embodiment, the alert action link may be a hyperlink designed to display a particular page, window, screen, etc. in the property management application. For example, if the alert is specific to a particular day in the future, the alert action link may direct the user to a home page for that particular day. On the home page, the interface may include controls to allow the property owner/manager to make adjustments to the property rate or other attributes. In another embodiment, the alert action link may have a default action associated with it designed to correct the situation that triggered the alert.

At block 950, method 900 determines if a selection of the alert action link is received. When the alert is displayed in the user interface of the property management application, or in an email, text message, or mobile application, the alert action link may be selectable by the user. If the user selects the link, a message may be sent to alert action module 235.

If at block 950, method 900 determines that a selection of the alert action link is received, at block 960, method 900 performs the corrective action associated with the alert action link. For example, alert action module 235 may display a particular page, window, screen, etc. in the property management application, such as the home page for that particular day associated with the alert. In another embodiment, the alert action link may have a default action associated with it designed to correct the situation that triggered the alert. For example, if the occupancy alert is triggered (indicating that the property is approaching full occupancy for a particular day), the alert action link may increase the rate for the property on that day. Upon receiving a selection of the alert action link by a user, alert action module 235 may automatically update the property rate for that day without receiving further user input. In another embodiment, if the booking deviation alert is triggered (indicating that bookings for a particular day are lower than normal), the alert action link may automatically decrease the rate for that day by a certain amount. In other embodiments, the default action associated with the alert action link may be specific to the particular alert. In addition, the default action may be configured by a user to suit their particular needs.

Figure 10:
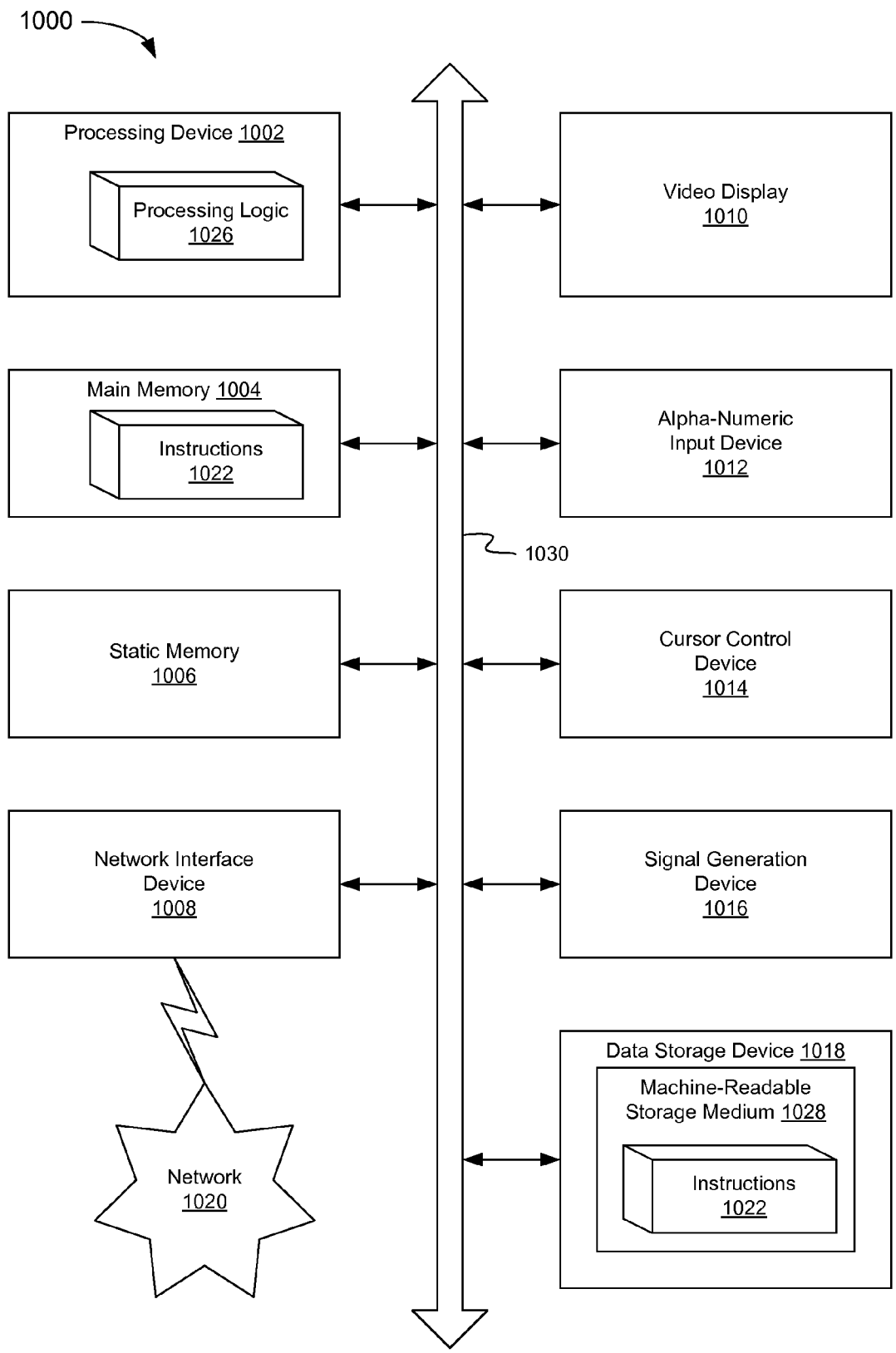
FIG. 10 is a block diagram illustrating a computer system, according to an embodiment.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

In one embodiment, computer system 1000 may be representative of a computing device, such as user device 120, property device 130 or a computer used to support cloud 110 and run travel alert manager 117.

The exemplary computer system 1000 includes a processing device 1002, a main memory 1004 (e.g., read-only memory (ROM), flash memory, dynamic random access memory (DRAM) (such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute processing logic 1026 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-accessible storage medium 1028, on which is stored one or more set of instructions 1022 (e.g., software) embodying any one or more of the methodologies of functions described herein. The instructions 1022 may also reside, completely or at least partially, within the main memory 1004 and/or within the processing device 1002 during execution thereof by the computer system 1000; the main memory 1004 and the processing device 1002 also constituting machine-accessible storage media. The instructions 1022 may further be transmitted or received over a network 1020 via the network interface device 1008.

The machine-readable storage medium 1028 may also be used to store instructions system triggered travel alerts, as described herein. While the machine-readable storage medium 1028 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
receiving travel data from a plurality of data sources;
identifying an alert data type from the travel data, wherein identifying the alert data type comprises determining whether the alert data type is associated with an in-band alert or an out-of-band alert, wherein the out-of-band alert is based on a comparison to historical travel data;
generating, by a processing device, an alert for the alert data type based on a primary alert condition, the alert to provide a notification that the travel data will affect a travel property;
determining a priority of the alert; and
issuing the alert when alerts matching the priority of the alert are authorized by system settings, wherein the system settings indicate that when the alert data type is associated with the in-band alert, to issue the alert during a runtime and when the alert data type is associated with the out-of-band alert, to issue the alert at the end of a day during which the travel data was received.

2. The method of claim 1, wherein determining the priority of the alert comprises determining whether the alert has a high priority or a low priority, and wherein the system settings always authorize high priority alerts and authorize low priority alerts when the travel property is an active property in a property management application.

3. The method of claim 1, further comprising:
determining whether an alert for the received travel data has previously been issued within an expiration period;
if an alert has been previously issued within the expiration period, comparing the travel data to a secondary alert condition, the secondary alert condition being different than the primary alert condition;
if the travel data satisfies the secondary alert condition, updating the alert; and
if the travel data does not satisfy the secondary alert condition, refraining from reissuing the alert.

4. The method of claim 1, further comprising:
determining whether the alert has an associated corrective action;
if the alert has an associated corrective action, issuing the alert with an alert action link corresponding to the associated corrective action.

5. The method of claim 4, further comprising:
receiving a selection of the alert action link; and
performing the associated corrective action, the corrective action to change how the travel data will affect a travel property.

6. A system comprising:
a processing device;
a memory operatively coupled to the processing device, the memory to store a travel alert manager, executable by the processing device from the memory, the travel alert manager to:
receive travel data from a plurality of data sources;
identify an alert data type from the travel data, wherein to identify the alert data type, the travel alert manager to determine whether the alert data type is associated with an in-band alert or an out-of-band alert, wherein the out-of-band alert is based on a comparison to historical travel data;
generate an alert for the alert data type based on a primary alert condition, the alert to provide a notification that the travel data will affect a travel property;
determine a priority of the alert; and
issue the alert when alerts matching the priority of the alert are authorized by system settings, wherein the system settings indicate that when the alert data type is associated with the in-band alert, to issue the alert during a runtime and when the alert data type is associated with the out-of-band alert, to issue the alert at the end of a day during which the travel data was received.

7. The system of claim 6, wherein to determine the priority of the alert, the travel alert manager to determine whether the alert has a high priority or a low priority, and wherein the system settings always authorize high priority alerts and authorize low priority alerts when the travel property is an active property in a property management application.

8. The system of claim 6, the travel manager further to:
determine whether an alert for the received travel data has previously been issued within an expiration period;
if an alert has been previously issued within the expiration period, compare the travel data to a secondary alert condition, the secondary alert condition being different than the primary alert condition;
if the travel data satisfies the secondary alert condition, update the alert; and
if the travel data does not satisfy the secondary alert condition, refrain from reissuing the alert.

9. The system of claim 6, the travel manager further to:
determine whether the alert has an associated corrective action;
if the alert has an associated corrective action, issue the alert with an alert action link corresponding to the associated corrective action.

10. The system of claim 9, the travel manager further to:
receive a selection of the alert action link; and
perform the associated corrective action, the corrective action to change how the travel data will affect a travel property.

11. A non-transitory computer-readable storage medium storing instructions which, when executed, cause a processing device to perform operations comprising:
receiving data from a plurality of data sources;
identifying an alert data type from the data, wherein identifying the alert data type comprises determining whether the alert data type is associated with an in-band alert or an out-of-band alert, wherein the out-of-band alert is based on a comparison to historical travel data;
generating, by the processing device, an alert for the alert data type based on a primary alert condition, the alert to provide a notification that the data will affect a travel property;
determining a priority of the alert; and
issuing the alert when alerts matching the priority of the alert are authorized by system settings, wherein the system settings indicate that when the alert data type is associated with the in-band alert, to issue the alert during a runtime and when the alert data type is associated with the out-of-band alert, to issue the alert at the end of a day during which the travel data was received.

12. The non-transitory computer-readable storage medium of claim 11, wherein determining the priority of the alert comprises determining whether the alert has a high priority or a low priority, and wherein the system settings always authorize high priority alerts and authorize low priority alerts when the travel property is an active property in a property management application.

13. The non-transitory computer-readable storage medium of claim 11, the operations further comprising:
determining whether an alert for the received data has previously been issued within an expiration period;
if an alert has been previously issued within the expiration period, comparing the data to a secondary alert condition, the secondary alert condition being different than the primary alert condition;
if the data satisfies the secondary alert condition, updating the alert; and
if the data does not satisfy the secondary alert condition, refraining from reissuing the alert.

14. The non-transitory computer-readable storage medium of claim 11, the operations further comprising:
determining whether the alert has an associated custom display;
if the alert has an associated custom display, issuing the alert with an alert action link to the custom display.

15. The non-transitory computer-readable storage medium of claim 14, the operations further comprising:
receiving a selection of the alert action link; and
directing a user to the custom display, the custom display to allow the user to view and interact with the data associated with the alert.

16. A method comprising:
generating, by a processing device, a first alert based on a primary alert condition, the alert to provide a notification that received travel data will affect a travel property;
determining whether the first alert comprises an in-band alert or an out-of-band alert, wherein the out-of-band alert is based on a comparison to historical travel data;
generating, by the processing device, a second alert based on the primary alert condition, the second alert having at least one alert parameter in common with the first alert and at least one unique alert parameter;
combining, by the processing device, the first alert and the second alert into a combined alert based on the at least one parameter in common; and
when the first alert comprises the in-band alert, issuing the combined alert during a runtime and when the first alert comprises the out-of-band alert, issuing the combined alert at the end of a day during which the travel data was received.

17. The method of claim 16, wherein the at least one alert parameter in common comprises at least one of a same day or a same travel property associated with the first and second alerts.

18. The method of claim 16, further comprising:
determining whether the first alert was previously issued;
if the first alert was previously issued, rescinding the first alert prior to issuing the combined alert.

* * * * *